US008524822B2

(12) United States Patent
Wiercinski (10) Patent No.: US 8,524,822 B2
(45) Date of Patent: Sep. 3, 2013

(54) VAPOR PERMEABLE LIQUID-APPLIED MEMBRANE

(75) Inventor: Robert A. Wiercinski, Lincoln, MA (US)

(73) Assignee: W. R. Grace & Co.—Conn., Columbia, MD (US)

( * ) Notice: Subject to any disclaimer, the term of this patent is extended or adjusted under 35 U.S.C. 154(b) by 2356 days.

(21) Appl. No.: 11/314,325

(22) Filed: Dec. 21, 2005

(65) Prior Publication Data

US 2006/0155031 A1      Jul. 13, 2006

Related U.S. Application Data

(60) Provisional application No. 60/642,880, filed on Jan. 11, 2005.

(51) Int. Cl.
*C08K 3/26* (2006.01)
(52) U.S. Cl.
USPC ........... 524/425; 524/445; 524/451; 524/431; 524/493; 524/557; 524/502
(58) Field of Classification Search
USPC ................ 524/425, 445, 451, 431, 493, 557, 524/502
See application file for complete search history.

(56) References Cited

U.S. PATENT DOCUMENTS

| | | | |
|---|---|---|---|
| 2,402,474 A | 6/1946 | Van Dyck et al. | 428/489 |
| 2,407,107 A | 9/1946 | Smith et al. | 524/459 |
| 3,196,122 A | 7/1965 | Evans et al. | 427/140 |
| 3,547,853 A | 12/1970 | Kalandiak et al. | 524/5 |
| 3,557,989 A | 1/1971 | Balda et al. | 215/261 |
| 3,801,404 A | 4/1974 | Druin et al. | 156/229 |
| 3,879,493 A | 4/1975 | Mudde et al. | 525/127 |
| 4,014,843 A * | 3/1977 | Xanthopoulo | 521/69 |
| 4,115,628 A | 9/1978 | Bonnemay et al. | 429/44 |
| 4,146,672 A * | 3/1979 | Jasperson | 428/332 |
| 4,163,822 A | 8/1979 | Walter | 428/317.3 |
| 4,411,951 A * | 10/1983 | Barsotti | 428/328 |
| 4,554,198 A | 11/1985 | von Blucher et al. | 428/143 |
| 4,571,415 A * | 2/1986 | Jordan, Jr. | 524/428 |
| 4,602,053 A * | 7/1986 | Huybrechts et al. | 523/436 |
| 4,613,544 A | 9/1986 | Burleigh | 428/315.5 |

(Continued)

FOREIGN PATENT DOCUMENTS

DE     19700311     3/2003
EP     0297686      1/1989

(Continued)

OTHER PUBLICATIONS

Garci-Rijon, J. App. Poly. Sci., vol. 31, Iss. 5, (1986) pp. 1483-1498.*

(Continued)

*Primary Examiner* — Mark Eashoo
*Assistant Examiner* — Michael A Salvitti
(74) *Attorney, Agent, or Firm* — Stephan P. Williams; Craig K. Leon

(57) ABSTRACT

Exemplary membranes, liquid compositions, and methods of the invention involve the use of a hydrophobic acrylic polymer and at least one water-soluble polymer (e.g., PVOH) for providing a water vapor permeable air barrier on construction surfaces. Unlike prior art vapor barriers, the present invention provides membranes having good crack-bridging and non-water-absorption characteristics.

22 Claims, 8 Drawing Sheets

Mechanism for Formation of Continuous Vapor Permeable Phase

Put hydrophilic material, like polyvinylalcohol, in aqueous phase

Aqueous latex          Water evaporation

Generate continuous network of hydrophilic material

Particle sintering

(56) References Cited

U.S. PATENT DOCUMENTS

| | | | |
|---|---|---|---|
| 4,774,131 A | 9/1988 | Dahmen et al. | 442/72 |
| 4,859,723 A * | 8/1989 | Kyminas et al. | 524/31 |
| 4,868,062 A | 9/1989 | Hoeschele et al. | 428/423.1 |
| 5,032,450 A | 7/1991 | Rechlicz et al. | 428/196 |
| 5,177,141 A | 1/1993 | Thoma et al. | 524/591 |
| 5,466,724 A | 11/1995 | Volke et al. | 523/111 |
| 5,506,024 A | 4/1996 | Flesher | 428/85 |
| 5,519,084 A | 5/1996 | Pak-Harvey et al. | 524/503 |
| 5,629,370 A | 5/1997 | Freidzon | 524/503 |
| 5,679,735 A * | 10/1997 | Geissler et al. | 524/459 |
| 5,709,976 A | 1/1998 | Malhotra | 428/32.11 |
| 5,744,570 A | 4/1998 | Gebben | 528/170 |
| 5,753,036 A | 5/1998 | Hornaman et al. | 106/810 |
| 5,795,928 A | 8/1998 | Janssen et al. | 524/48 |
| 5,834,538 A | 11/1998 | deHullu et al. | 524/22 |
| 6,136,916 A | 10/2000 | Arkens et al. | 524/556 |
| 6,262,329 B1 | 7/2001 | Brunsveld et al. | 602/54 |
| 6,347,866 B1 | 2/2002 | Sunderrajan et al. | 347/100 |
| 6,350,808 B1 * | 2/2002 | Schmitz et al. | 524/503 |
| 6,444,302 B1 | 9/2002 | Srinivas et al. | 428/315.5 |
| 6,630,533 B2 * | 10/2003 | Konopka et al. | 524/560 |
| 6,632,486 B1 | 10/2003 | Sadasivan et al. | |
| 6,635,319 B1 | 10/2003 | Sunderrajan et al. | 428/32.15 |
| 6,713,550 B2 | 3/2004 | Schliesman et al. | 524/492 |
| 6,761,969 B2 | 7/2004 | Li et al. | 428/354 |
| 2003/0229171 A1 * | 12/2003 | Zhao et al. | 524/425 |
| 2004/0107662 A1 | 6/2004 | Georgeau et al. | |
| 2005/0261407 A1 * | 11/2005 | Khan et al. | 524/405 |

FOREIGN PATENT DOCUMENTS

| | | |
|---|---|---|
| EP | 0538571 | 4/1993 |
| EP | 0671420 | 9/1995 |
| EP | 0718314 | 6/1996 |
| EP | 0723975 | 7/1996 |
| EP | 0760834 B1 | 10/1998 |
| EP | 0885716 | 12/1998 |
| EP | 1069093 A1 | 1/2001 |
| FR | 2516104 | 11/1981 |
| GB | 1438449 | 6/1976 |
| JP | 62141183 | 6/1987 |
| JP | 11048417 | 2/1999 |
| JP | 11107170 | 4/1999 |
| JP | 87161981 | 3/2003 |
| JP | 2004003118 A | 1/2004 |
| WO | 9637668 | 11/1996 |
| WO | 9947623 | 9/1999 |
| WO | 9954422 | 10/1999 |
| WO | 0023492 | 4/2000 |

OTHER PUBLICATIONS

ARKEMA Functionalized Polyolefin MSDS (http://www.arkema-inc.com/index.cfm?pag=115). No author.*
Baurdio et al. European Polymer Journal. 35 (1999) 775-780. pBADensity listed on p. 778, first paragraph.*
Calcium Carbonate density, NIST website: http://physics.nist.gov/cgi-bin/Star/compos.pl?matno=129. No author.*
"Methyl Cellulose" Sigma-Aldrich Product Information. Jun. 3, 1997. Obtained from aldrich.com. No Author.*
"Talc". Obtained from webmineral.com/data/Talc.shtml. Obtained Jul. 25, 2009. Publication Date not available.*
"Innovative Technology Report". Jan. 1997. Obtained from engineering.purdue.edu. No Author.*
Stephan Williams correspondence from Nov. 17, 2009.*
International Search Report for PCT/US2006/000114 dated Aug. 27, 2007, 2 pages.
Written Opinion of the International Searching authority for PCT/US2006/000114 dated Aug. 27, 2007, 4 pages.
International Preliminary Report on Patentability for PCT/US2006/000114 dated Sep. 18, 2007, 5 pages.
BETEC® Flex, Substructure Waterproofing, Grace Construction Products, Printed Oct. 2004, 2 pages.
Hercules Product Data Sheet 4379 (2007).
Hercules Product Data Sheet 4146-1 (2005).
Dow Methocel Product Sheet (Mar. 2001).
Plehiers, Supplementary European Search Report and the European Search opinion on European Patent Application No. EP06717335, dated Oct. 27, 2010, 5 pages.

* cited by examiner

VAPOR PERMEABLE LIQUID-APPLIED MEMBRANE

This application claims the benefit of U.S. Provisional Application No. 60/642,880 filed on Jan. 11, 2005.

FIELD OF THE INVENTION

The invention relates to a waterproof, water-vapor permeable membrane, and more particularly to a membrane made from liquid-applied compositions having a hydrophobic acrylic polymer phase and a continuous water-soluble polymer phase operative as a conduit for the passage of moisture vapor.

BACKGROUND OF THE INVENTION

It is known to form water-vapor permeable, air barrier membranes on building construction surfaces using a liquid coating composition. Such a composition is available from Henry Company, California, under the trade name AIR-BLOC 31. This composition can be spray-applied and cures to form a membrane that blocks air and air leakage and purportedly achieves a water vapor permeance of 12.3 perms (or 704 ng/Pa.m$^2$.s) under ASTM E-96 (Henry Technical Data Sheet dated Jul. 15, 2002).

The membrane formed by the composition is believed to have a microporous structure. Microporosity is achieved by loading fillers or hard particulate materials to a level exceeding the critical "pigment volume concentration" ("PVC"). Above this critical point, the amount of filler disrupts the continuity of the polymer matrix, such that conduits are formed through which water vapor can permeate.

The Henry composition is believed to comprise approximately 15 parts calcium carbonate (a typical filler), 35 parts hydrocarbon wax (considered here to act as a filler because it does not form a film), and 50 parts vinyl acetate-acrylate copolymer, such that the critical pigment volume concentration (PVC) is exceeded.

The PVC value is determined by multiplying volume of fillers (including non-film-forming material) by 100 and dividing this product by total volume of solids. The PVC is calculated as follows: PVC=100×((wt % wax/wax density)+(wt % filler/filler density))/((wt % wax/wax density)+(wt % filler/filler density)+(wt % polymer/polymer density))=(35+(15/2.6))×100/(35+(15/2.6)+50)=45%. This figure is believed to exceed the critical PVC. Although vapor-permeable and liquid-water-impermeable, the membrane resulting from the composition is believed by the present inventor to have low elongation and poor crack-bridging properties. Furthermore, the membrane also absorbs a large amount of water.

In view of the foregoing disadvantages, the present inventor believes that novel liquid-applied vapor barrier compositions and methods are needed.

SUMMARY OF THE INVENTION

In surmounting the disadvantages of the prior art, the present invention provides a water vapor-permeable, air- and liquid-water-barrier membrane that minimizes condensation and consequent mold growth in building structures.

In addition to air- and water-impermeability and vapor-permeability, the membrane also has low water absorption, high elongation, and sufficient body (wet coating thickness) for bridging board joints and cracks which can expand and contract with temperature and humidity cycling. The membrane is spray-applicable. When allowed to dry, this membrane is fully adhered to the substrate surface.

Instead of using inorganic fillers loaded beyond a critical pigment volume concentration (PVC), which can lead to a microporous but weakened matrix structure, compositions of the present invention comprise a hydrophobic acrylic polymer phase to provide liquid water impermeability and a continuous water-soluble polymer phase to provide water vapor permeability. Optionally, fillers may be incorporated at levels not exceeding critical PVC.

Thus, an exemplary liquid composition of the present invention for providing a vapor permeable air barrier membrane on a construction surface, comprises an emulsion having at least one hydrophobic acrylic polymer having a repeating group represented by the formula —(CH$_2$—CH(COOR)—)— wherein R represents a C$_2$-C$_8$ alkyl group, the at least one acrylic polymer having a glass transition temperature of −55° C. to 0° C. and being present in an amount of 50% to 97% by weight based on total dry solids.

As mentioned, exemplary liquid compositions may further comprise an inorganic filler selected from the group of calcium carbonate, talc, clay, silica, and titanium dioxide in an amount of 0-50% by weight based on total solids. The PVC may be 0-25% as computed by multiplying the volume of filler and other hard non-film forming ingredients by 100 and dividing this by total volume of solids. Preferably, the amount of filler should be less than that required to exceed critical PVC. In other words, the resultant membrane is not microporous.

The liquid composition further comprises water in an amount of 30% to 50% by total weight, and at least one water-soluble polymer present in an amount of 3% to 17% by weight based on total dry weight solids. Four percent by weight of the water-soluble polymer in water should have a solution viscosity of 2 to 50 centipoise. Preferably, the water-soluble polymer is selected from the group consisting of a polyvinyl alcohol having a number average molecular weight of 5,000 to 50,000; a polyethylene oxide having an average molecular weight of 5,000 to 200,000; and a methyl ether or ethyl ether of cellulose having a number average molecular weight of 3,000 to 20,000.

An exemplary membrane of the invention, formed by spraying the composition onto a substrate surface, is preferably 20-60 mils in dry thickness, and has a water vapor permeability of 1-20 perms, and more preferably 2-10 perms. At such thicknesses, membranes made from the coating compositions of the invention exhibit high elongation, which bestows excellent crack-bridging capabilities.

The present invention provides methods for coating substrate surfaces, such as gypsum board, structures made of cement, masonry, or concrete, or structures made of wood. The present invention also pertains to composite structures formed by coating such substrates surfaces with the aforementioned coating compositions.

Further advantages and features of the invention are described in further detail hereinafter.

BRIEF DESCRIPTION OF THE DRAWINGS

A better appreciation of the invention is facilitated by the following Detailed Description of Exemplary Embodiments, taken in conjunction with the appended drawings, wherein.

DETAILED DESCRIPTION OF EXEMPLARY EMBODIMENTS

Moisture vapor permeable air barrier membranes of the invention are made by casting, onto a substrate surface, a liquid composition that preferably comprises an anionic or a non-ionic acrylic emulsion, at least one water-soluble polymer, and, optionally, a filler such as calcium carbonate, talc, sand, or other particulate (and preferably inorganic) material, or combination of such optional fillers.

Further optional ingredients include colorants ("pigments" in the usual sense of imparting color the membrane), rheology modifiers, antioxidants, UV stabilizers, antifoam agents, and biocides.

Component amounts of exemplary liquid compositions of the present invention are expressed in terms of percentage dry weight based on total solids unless otherwise indicated.

An exemplary liquid composition suitable for use in the invention involves an emulsion comprising at least one hydrophobic acrylic polymer having a repeating group represented by the formula —($CH_2$—CH(COOR)—)— wherein R represents a $C_2$-$C_8$ alkyl group, the at least one acrylic polymer having a glass transition temperature of −55° C. to 0° C. and being present in an amount of 50% to 97% by weight based on total dry solids. The polymer may comprise other monomers as well including, but not limited to, styrene, vinyl acetate, and vinyl chloride.

An exemplary liquid composition suitable for use in the invention involves an emulsion comprising butyl acrylate and styrene. The molar ratio of butyl acrylate/styrene is greater than 1. The preferred molar ratio of butyl acrylate/styrene is greater than 1.5

Preferably, R represents an ethyl, propyl, butyl, octyl or ethyl hexyl polymer. More preferably, the hydrophobic acrylic polymer is a butyl acrylate. Further exemplary compositions may further include a meth(acrylic) polymer. The level of acrylic polymer is preferably 50% to 97% and more preferably 60% to 90% based on total solids in the composition.

Exemplary liquid compositions further comprise at least one water-soluble polymer. The water-soluble polymer should be present in the liquid composition in an amount of 3% to 17% by weight based on total dry weight solids. The water-soluble polymer should also have a solution viscosity, at 4% by weight of the water-soluble polymer in water, of about 2 to 50 centipoise (cps).

Preferred water soluble polymers are selected from the group consisting of a polyvinyl alcohol having a number average molecular weight of 5,000 to 50,000; a polyethylene oxide having an average molecular weight of 5,000 to 200, 000; and a methyl ether or ethyl ether of cellulose having a number average molecular weight of 3,000 to 20,000. Methyl cellulose ethers are available from Dow Chemical under the trade name METHOCEL A, and are believed to contain 27.5 to 31.5% methoxyl or a methoxyl degree of substitution of 1.64 to 1.92. Other water soluble polymers include hydroxypropyl methyl cellulose, hydroxyethyl cellulose, polymers comprising vinyl methyl ether, polymers including hydrolyzed maleic anhydride polymers and copolymers, and copolymers having vinyl ethers, styrenes, ethylene, and other olefins, polyvinylpyrrolidone, sulfonated polystyrene, polysulfethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums.

Both cold water soluble and hot water soluble grades of polyvinyl alcohol may be used. Cold water soluble grades have a degree of hydrolysis between 80% to 90%. Hot water soluble grades have a degree of hydrolysis between 90% to 100%.

As previously mentioned, however, polyvinyl alcohol, polyethylene oxide and methyl cellulose are the most preferred water-soluble polymers. The use of low MW versions of these polymers insures that the liquid composition has a viscosity that is low enough to facilitate spraying of the liquid composition, and the weight fraction of water soluble polymer is high enough to insure high water vapor permeability.

Optionally, exemplary liquid compositions of the invention further comprise an inorganic filler selected from the group of calcium carbonate, talc, clay, silica, and titanium dioxide, the at least one filler being present in an amount of 0-50% by weight based on total solids in the composition. The pigment volume concentration can be 0-25%. PVC=100× volume % fillers (and other non-film forming ingredients)/volume % of all solid ingredients (acrylic and water soluble polymers are film forming ingredients) (when computed using the formula described in the background section and incorporated herein by reference), and should be less than the critical pigment volume concentration (above which a dried film coating provided by the liquid composition would become microporous). Preferably, the filler material has an average particle size no less than 0.1 um and no greater than 50 um.

The filler level is more preferably 2% to 40%, and more preferably 5-30%, based on weight of total solids in the composition.

The composition may be spray-applied, brushed, trowelled, or otherwise coated onto the target substrate. Substrates include cementitious surfaces (e.g., cement, mortar, masonry, concrete, shotcrete, gypsum) as well as gypsum board, and other porous structures, such as wood or plywood, that can be used for fabricating buildings and other enclosures inhabited by humans or animals.

Accordingly, the present invention pertains to methods for waterproofing a substrate comprising the step of coating the composition onto the substrate surface, as well as composites (e.g., building panels, walls, foundation surfaces, deck surfaces, roofing surfaces) treated by the compositions and methods described above.

Preferably, membranes formed by coating the compositions onto substrates surfaces have an average dry thickness of 10-100 mils; more preferably, an average dry thickness of 20-80 mils; and, most preferably, an average dry thickness of 40-60 mils.

Exemplary membranes formed by the compositions also preferably have a vapor permeability of no less than 2 perms, and no greater than 20 perms, in accordance with ASTM E-96; an elongation of no less than 200%, and no greater than 1000%; a water absorption value of less than 50% after one day (24 hours) of immersion in water; and a pigment volume concentration (PVC) of 0% to 25%.

In exemplary compositions of the invention, the weight fraction of the continuous water-soluble polymer phase should be 3% to 17%, and more preferably 5% to 10%, based on total solids weight of the liquid composition. The level of water-soluble polymer is in addition to any water-soluble polymer that may be used as a protective colloid in the acrylic emulsion (if the emulsion is supplied by an emulsion manufacturer).

Figure 1:
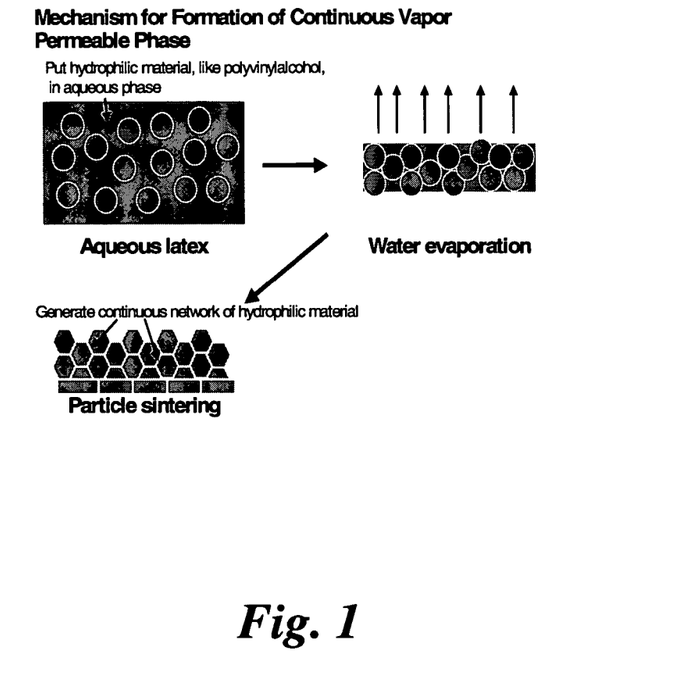
FIG. 1 is a schematic illustration of the mechanism whereby compositions of the present invention form a continuous water vapor permeable phase.

As illustrated in FIG. 1, the mechanism for forming a two-phase composition is as follows. A water-soluble polymer is dissolved in the aqueous phase of a pre-manufactured anionic or non-ionic acrylic emulsion. The liquid composition is cast onto a substrate, and water is allowed to evaporate. After most of the water has evaporated, the two-phase composition is formed. The water-soluble polymer (e.g., PVOH dissolved in solution) will precipitate out of solution as water evaporates, and it will constitute the continuous phase within the resultant membrane coating.

Thus, membranes formed by liquid coating of the composition owe their vapor permeability to the presence of the hydrophilic conduit established by the water-soluble polymer phase, and not to microporosity. As pigment volume concentration (PVC) is determined by multiplying by 100 the volume of filler (inorganics and non-film forming, non-volatile materials) and dividing this by the total volume of solids, it will be understood that, at high values of PVC, the amounts of film forming materials (such as the acrylic polymer) will be insufficient for purposes of wetting the entirety of non-film forming ingredients, and microporosity will result. The CPVC (critical pigment volume concentration) is the concentration of filler material solids at which the transition from non-porosity to microporosity occurs.

Compositions of the present invention are not microporous but exhibit a low PVC. The PVC is preferably less than or equal to 25%. Preferably, the PVC of compositions of the invention is less than or equal to 16%.

Figure 2:
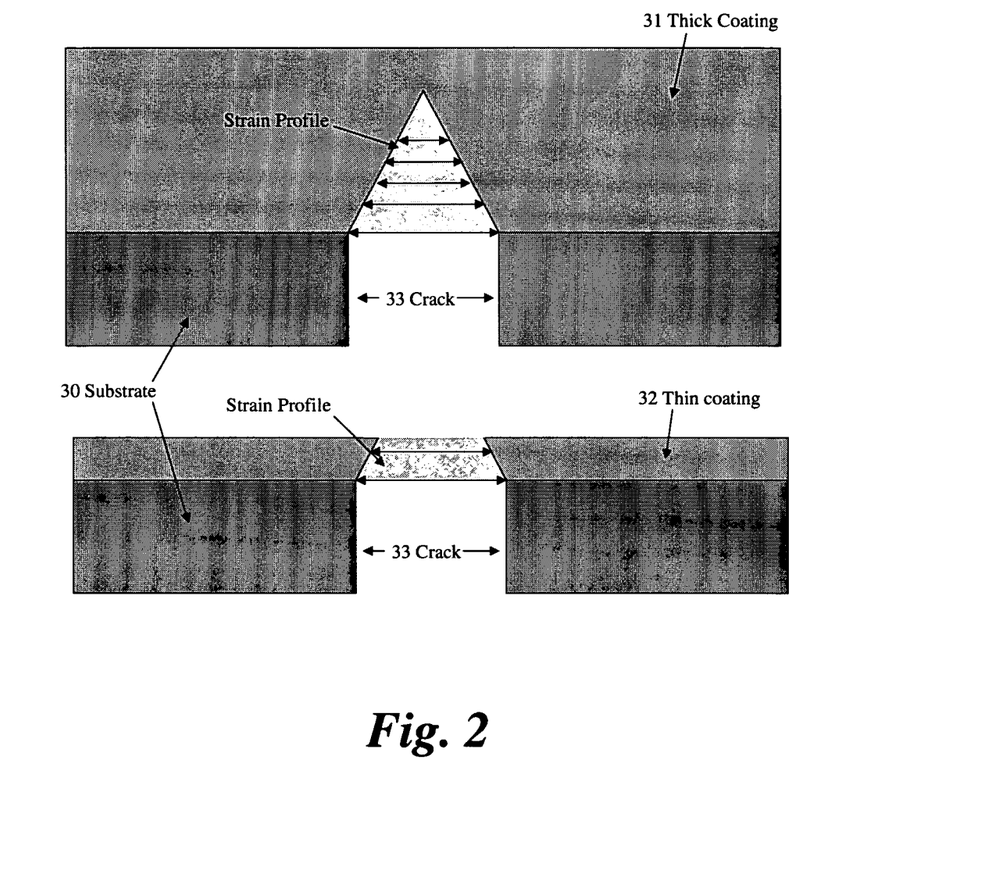
FIG. 2 is a comparative illustration of the crack bridging property provided by, respectively, a thin membrane coating and an exemplary thick membrane coating of the present invention.

Compositions of the present invention provide good crack bridging characteristics by combining of high elongation with high film thickness capabilities. As illustrated in FIG. 2, a crack 33 in a substrate surface 30 such as a concrete or gypsum board wall expands and contracts with temperature and humidity fluctuations. When crack 33 expansion occurs, there is a gradient in the strain profile. The strain at the top portion of the coating is greater for a thin coating 32 than it is for a thick coating 31. Thus, failure will occur in a thin coating 32 more quickly than it will occur in a thick coating 31 for a given crack size.

The illustration in FIG. 2 suggests the fundamental differences between liquid-applied compositions of the present invention in comparison with simple paint coatings. Paints are intended to be applied as thin coatings, which result in dry thicknesses of less than 10 mils. In contrast, membranes of the present invention have average dry film thicknesses of greater than 20 mils, and more preferably greater than 40 mils.

The following examples are provided for illustrative purposes.

Example 1

Figure 3:
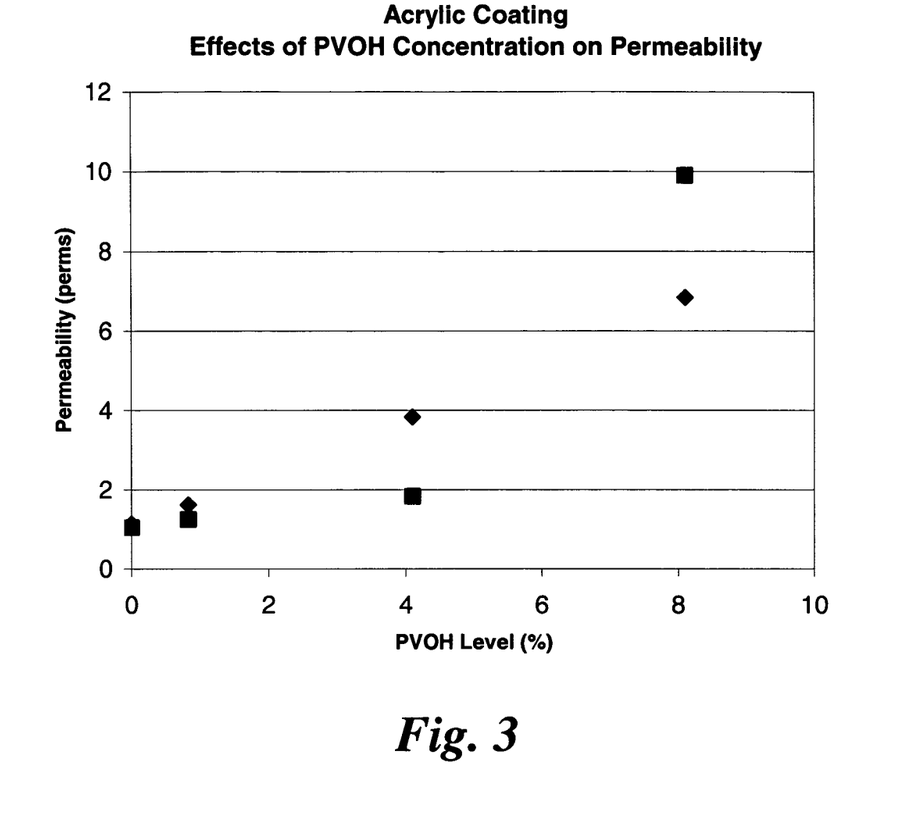
FIGS. 3 and 4 are illustrations of the effects of polyvinyl alcohol (PVOH) concentration on permeability, strength, and elongation in exemplary compositions of the present invention.
Figure 4:
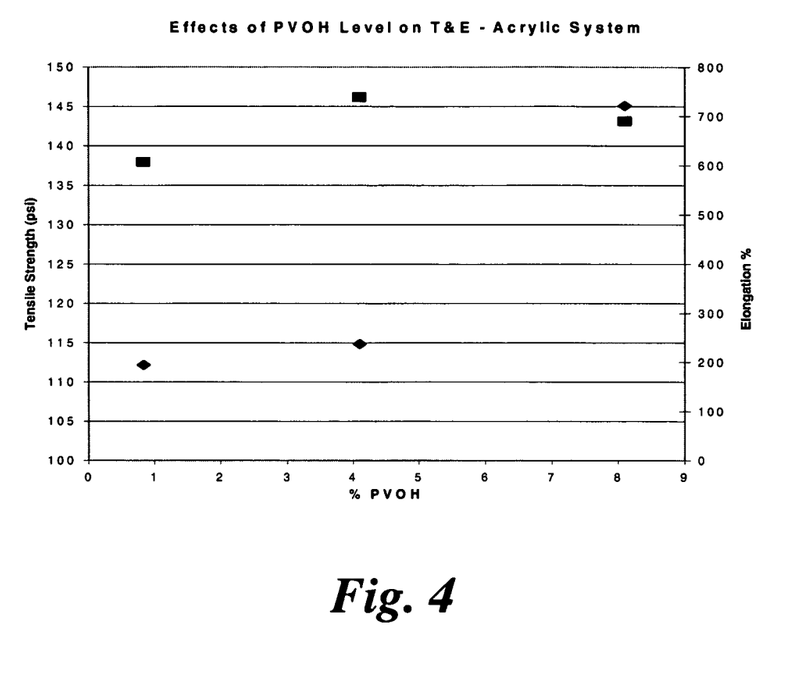

The effects of polyvinyl alcohol (PVOH) concentration on permeability, strength, and elongation are demonstrated for a system comprising only acrylic polymer and PVOH (polyvinyl alcohol). The acrylic polymer was obtained from BASF under the trade name ACRONAL S400). The PVOH is available from Dupont under the trade name ELVANOL 51-05. Permeability results were replicated, and two sets of data are shown in FIGS. 3 and 4 respectively. Note that permeability is proportional to the level of PVOH. Tensile strength is also proportional to the level of PVOH. However, elongation is relatively unaffected at low PVOH levels.

Example 2

The effects of acrylic polymer level, filler level, and polyvinyl alcohol level on permeability, strength, and elongation in membranes formed from liquid compositions were tested. For purposes of formulating the liquid composition, the acrylic polymer was obtained from BASF (ACRONAL S400), while the PVOH was obtained from the Celanese Corporation. The various membrane compositions are presented in Table 1.

Figure 5:
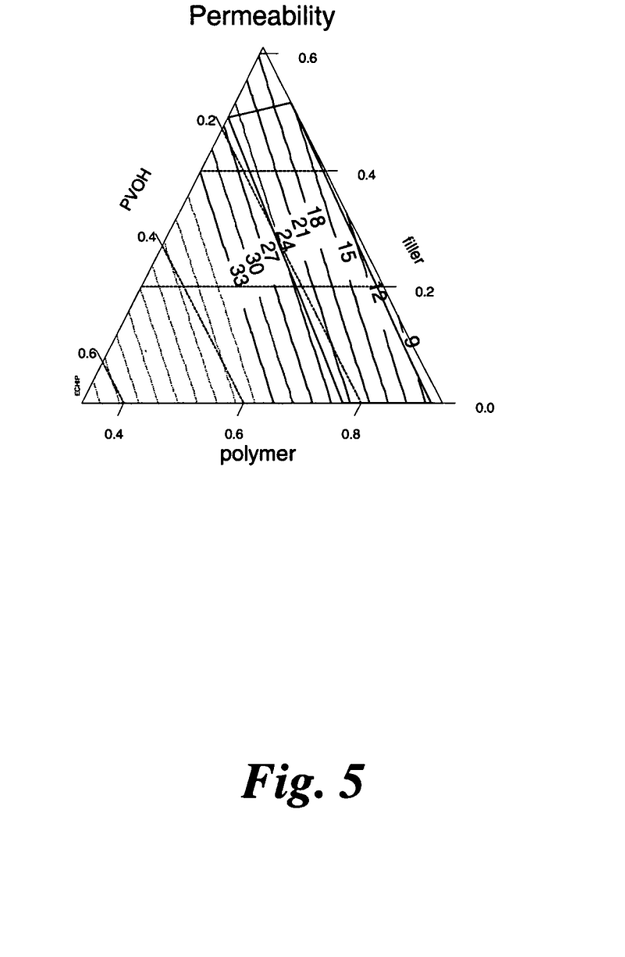
FIG. 5 is a graphic illustration of permeability for exemplary membranes of the invention.
Figure 6:
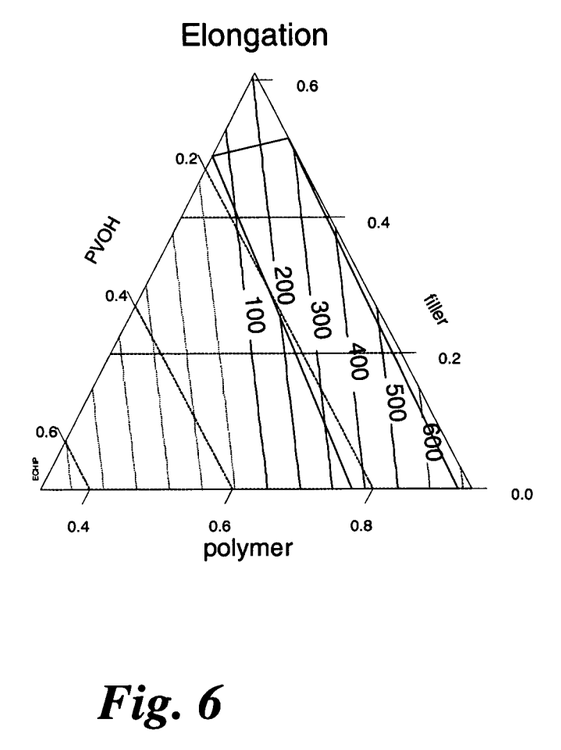
FIG. 6 is a graphic illustration of elongation for exemplary membranes of the invention.
Figure 7:
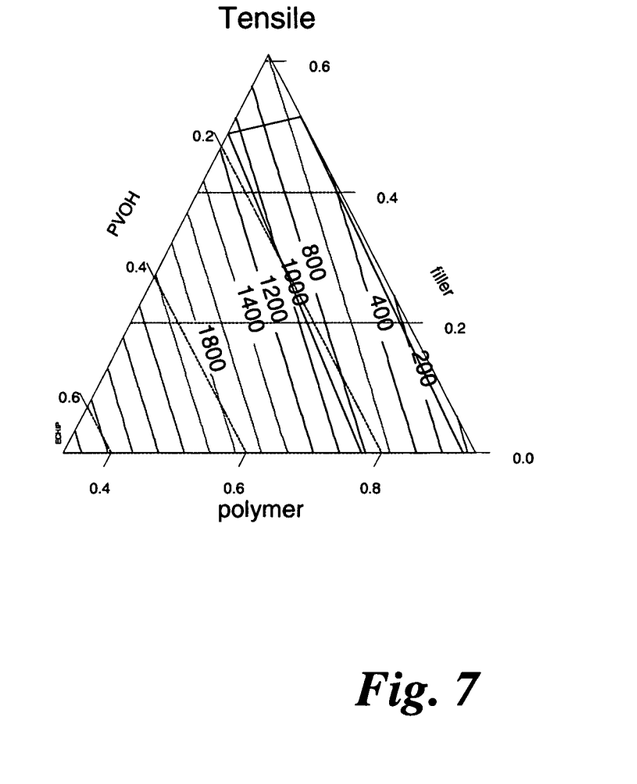
FIG. 7 is a graphic illustration of strength for exemplary membranes of the invention.

Permeability, elongation, and strength of membranes are plotted in FIGS. 5, 6, and 7, respectively. It is noted that permeability is most dependent on PVOH concentration, and varies between 8 perms and 27 perms for formulations comprising 6% to 23%, respectively, of PVOH. Elongation is at a maximum for membranes formed from compositions comprising a high polymer level and a low levels of PVOH and fillers. Good permeability and high elongation were found in membranes formed from compositions 7 and 9. Permeability was found to be 12 perms and 8 perms, respectively. Elongation values are 460% and 680%, respectively.

TABLE 1

| No. | polymer | filler | PVOH |
|-----|---------|--------|------|
| 5   | 0.33    | 0.49   | 0.18 |
| 4   | 0.38    | 0.50   | 0.13 |
| 1   | 0.77    | 0.00   | 0.23 |
| 10  | 0.42    | 0.51   | 0.06 |
| 11  | 0.58    | 0.28   | 0.14 |
| 7   | 0.64    | 0.29   | 0.07 |
| 1   | 0.77    | 0.00   | 0.23 |
| 9   | 0.92    | 0.00   | 0.08 |
| 3   | 0.84    | 0.00   | 0.16 |
| 5   | 0.33    | 0.49   | 0.18 |
| 2   | 0.53    | 0.27   | 0.20 |
| 3   | 0.84    | 0.00   | 0.16 |
| 1   | 0.77    | 0.00   | 0.23 |
| 2   | 0.53    | 0.27   | 0.20 |

Example 3

The effects of acrylic polymer, filler, and PVOH levels on water absorption were tested for membranes made from compositions using acrylic polymer from the Henry Company and sold under the trade name AIR-BLOC 31. Ingredient types are the same as for Example 2. Films have 60 mil dry average thickness were cast for each sample. Dry films were immersed in tap water for 24 hours. The results for membranes made from the various compositions are presented in Table 2 below. Water absorption is measured in terms of percentage (the table indicates where the membranes ruptured ("broke") due to weakness). It is noted that water absorption is approximately proportional to PVOH level. Lower PVOH levels are preferred to minimize water absorption.

TABLE 2

| Composition | | | Water Absorption of Membrane |
|---|---|---|---|
| polymer | filler | PVOH | (%) |
| 0.33 | 0.49 | 0.18 | 28.5 |
| 0.38 | 0.50 | 0.13 | 32.1 |
| 0.77 | 0.00 | 0.23 | Broke |
| 0.42 | 0.51 | 0.06 | 39.1 |
| 0.58 | 0.28 | 0.14 | 52.1 |
| 0.64 | 0.29 | 0.07 | 15.5 |
| 0.77 | 0.00 | 0.23 | Broke |
| 0.92 | 0.00 | 0.08 | 19.1 |
| 0.84 | 0.00 | 0.16 | 63.5 |
| 0.33 | 0.49 | 0.18 | Broke |
| 0.53 | 0.27 | 0.20 | 44 |
| 0.84 | 0.00 | 0.16 | 75.5 |
| 0.77 | 0.00 | 0.23 | Broke |
| 0.53 | 0.27 | 0.20 | Broke |

Water absorption for the Henry composition was determined to be 102%. As for the other specimens, a 60 mil. dry film of the commercially available product was cast and immersed in water for 24 hours. Water absorption on a weight percentage basis was measured.

Example 4

Figure 8:
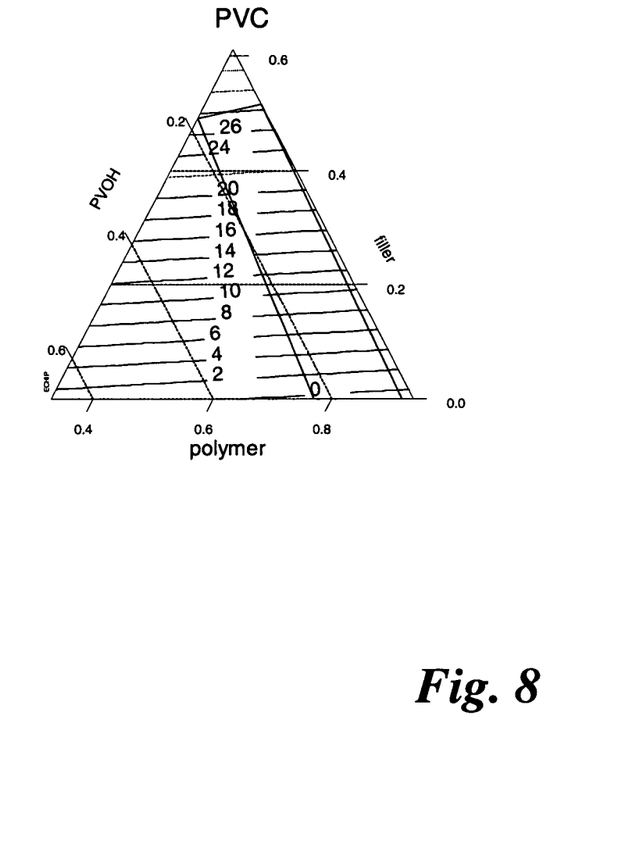
FIG. 8 is a graphic illustration of pigment volume concentration (PVC) for exemplary membranes of the invention.

Pigment volume concentration was calculated for compositions of the present invention, and shown in FIG. 8. It is noted that pigment volume concentration for compositions of the present invention ranges up to 25%. In contrast, the PVC for the Henry composition was determined to be 45%

Example 5

The effects of PVOH molecular weight on formulation viscosity were evaluated. It is necessary to have enough PVOH to yield the targeted permeability, but PVOH molecular weight must be low enough to permit spray application of the liquid composition. A formulation used for all tests is shown in Table 3. PVOH molecular weight and liquid composition viscosities are shown in Table 4.

It is noted that liquid composition viscosity is proportional to PVOH molecular weight. Formulation no. 1 could not be easily spray applied, but the other formulations could be easily spray applied.

TABLE 3

| | Viscosity |
|---|---|
| Acrylic, Emulsion | 56.5 |
| Water | 24 |
| Polyvinyl Alcohol | 3.75 |
| CaCO3 | 15 |
| Pigment | 0.5 |
| Antifoam | 0.25 |
| Total | 100 |

TABLE 4

| No. | PVOH MW | 4% Aqueous Solution Viscosity (cps) | Compound Viscosity (cps) | | |
|---|---|---|---|---|---|
| | | | 0.5 RPM | 5 RPM | 50 RPM |
| 1 | 80,000 | 18 | 35200 | 17360 | ND |
| 2 | 10,000–13,000 | 5 | 1600 | 480 | 272 |
| 3 | 15,000–23,000 | 6 | 2400 | 960 | 640 |
| 4 | 7,000–10,000 | 3 | 800 | 320 | 168 |

The foregoing examples and embodiments are for illustrative purposes only, and intended to limit the scope of the invention.

It is claimed:

1. A liquid composition for providing a vapor permeable air barrier membrane by spray coating onto a construction surface, comprising:
   an emulsion comprising at least one hydrophobic acrylic polymer having a repeating group represented by the formula —(CH$_2$—CH(COOR)—)— wherein R represents a C$_2$-C$_8$ alkyl group, said at least one acrylic polymer having a glass transition temperature of −55° C. to 0° C. and being present in an amount no less than 50% and no greater than 97% by weight based on total solids in the composition;
   said liquid composition further comprising at least one inorganic filler selected from the group of calcium carbonate, talc, clay, silica, and titanium dioxide, said at least one inorganic filler being present in an amount of 5% to 30% by weight based on total solids in said liquid composition; the total amount of all inorganic filler contained within said liquid composition being present in an amount such that pigment volume concentration (PVC) is no greater than 16%;
   said liquid composition further comprising water in an amount no less than 30% and no greater than 50% by total weight of said liquid composition; and
   said liquid composition further comprising at least one water-soluble polymer being present in an amount no less than 5% and no greater than 17% by weight based on total solids in said liquid composition, and said at least one-water-soluble polymer having a solution viscosity, at 4% by weight in water, of no less than 2 centipoise and no greater than 50 centipoise.

2. The composition of claim 1 wherein said at least one-water-soluble polymer is selected from the group consisting of
   polyvinyl alcohol having a number average molecular weight no less than 5,000 and no greater than 50,000;
   a polyethylene oxide having an average molecular weight no less than 5,000 and no greater than 200,000; and
   a methyl ether or ethyl ether of cellulose having a number average molecular weight no less than 3,000 and no greater than 20,000.

3. The composition of claim 1 wherein said at least one-water-soluble polymer is a polyvinyl alcohol having a number average molecular weight no less than 5,000 and no greater than 50,000.

4. The composition of claim 1 wherein said at least one-water-soluble polymer is a polyethylene oxide having an average molecular weight no less than 5,000 and no greater than 200,000.

5. The composition of claim 1 wherein said at least one-water-soluble polymer is a methyl ether or ethyl ether of cellulose having a number average molecular weight no less than 3,000 and no greater than 20,000.

6. The composition of claim 1 wherein, in said at least one hydrophobic acrylic polymer, R represents an ethyl, propyl, butyl, octyl or ethyl hexyl.

7. The composition of claim 1 further comprising a hydrophobic meth(acrylic) polymer.

8. The composition of claim 1 wherein said at least one hydrophobic acrylic polymer is a butyl acrylate polymer.

9. The composition of claim 1 wherein at least one hydrophobic polymer is a copolymer of butyl acrylate and styrene.

10. The composition of claim 9 wherein the molar ratio of butyl acrylate/styrene is greater than 1.5.

11. The composition of claim 1 wherein said inorganic filler is calcium carbonate.

12. The composition of claim 1 wherein said inorganic filler has an average particle size no less than 0.1 um and no greater than 50 um.

13. The composition of claim 3 wherein said polyvinyl alcohol has a degree of hydrolysis of 80 to 90 percent.

14. The composition of claim 3 wherein said polyvinyl alcohol has a degree of hydrolysis of 90 to 100 percent.

15. A membrane made by spray coating a substrate surface with the composition of claim 1 and allowing the composition to dry.

16. A method for forming a moisture vapor permeable membrane, comprising: spray coating onto a cementitious, wood, or gypsum substrate the composition of claim 1 and allowing the composition to dry.

17. A composite comprising a building panel or cementitious body coated with the composition of claim 1.

18. The membrane of claim 15 having an average thickness no less than 20 mils and no greater than 100 mils thick.

19. The membrane of claim 15 having an average thickness no less than 40 mils.

20. The membrane of claim 15 having an average thickness of no less than 40 mils and no greater than 100 mils thick, a vapor permeability of no less than 2 perms and no greater than 20 perms in accordance with ASTM E-96; and an elongation of no less than 200% and no greater than 1000%; and a water absorption value of less than 50% after one day immersion in water.

21. The method of claim 16 wherein the moisture vapor permeable membrane has an average thickness of 20 mils to 100 mils.

22. The composite of claim 17 wherein the coated composition, after drying, forms a moisture vapor permeable membrane having an average thickness of 20 mils to 100 mils.

* * * * *